(12) United States Patent
Eisner et al.

(10) Patent No.: US 9,874,301 B2
(45) Date of Patent: Jan. 23, 2018

(54) VIBRATION REDUCING PIPE JUNCTION

(71) Applicants: Blake Eisner, Houston, TX (US); Kurt C. Gramoll, Norman, OK (US)

(72) Inventors: Blake Eisner, Houston, TX (US); Kurt C. Gramoll, Norman, OK (US)

(73) Assignee: The Board of Regents of the University of Oklahoma, Norman, OK (US)

( * ) Notice: Subject to any disclaimer, the term of this patent is extended or adjusted under 35 U.S.C. 154(b) by 377 days.

(21) Appl. No.: 14/628,705

(22) Filed: Feb. 23, 2015

(65) Prior Publication Data

US 2015/0240982 A1  Aug. 27, 2015

Related U.S. Application Data

(60) Provisional application No. 61/943,093, filed on Feb. 21, 2014.

(51) Int. Cl.
*E21B 43/26* (2006.01)
*F16L 41/02* (2006.01)
*F16L 55/027* (2006.01)
*F16L 55/04* (2006.01)

(52) U.S. Cl.
CPC ............ *F16L 41/021* (2013.01); *E21B 43/26* (2013.01); *F16L 55/02772* (2013.01); *F16L 55/041* (2013.01); *Y10T 137/86131* (2015.04)

(58) Field of Classification Search
CPC .............................. F16L 41/021; E21B 43/26
USPC ...................................................... 285/133.11
See application file for complete search history.

(56) References Cited

U.S. PATENT DOCUMENTS

| | | | | |
|---|---|---|---|---|
| 917,395 | A * | 4/1909 | Wise | E03C 1/24 285/133.11 |
| 965,008 | A * | 7/1910 | Perkins | F16L 19/065 277/622 |
| 3,690,702 | A * | 9/1972 | Moore | F16L 41/021 285/133.3 |
| 3,735,928 | A * | 5/1973 | Watts | B05B 15/069 138/89 |
| 5,387,015 | A * | 2/1995 | Sisk | F16L 41/021 285/133.11 |
| 6,179,342 | B1 * | 1/2001 | Shen | F15D 1/04 285/129.2 |
| 6,422,608 | B1 * | 7/2002 | Lee | B65G 53/523 285/131.1 |
| 2013/0175038 | A1 * | 7/2013 | Conrad | E21B 43/26 166/308.1 |
| 2015/0000766 | A1 * | 1/2015 | Arizpe | F16L 41/03 137/356 |

* cited by examiner

*Primary Examiner* — Giovanna C. Wright
(74) *Attorney, Agent, or Firm* — Hall Estill Law Firm

(57) ABSTRACT

A t-junction for use in a pipe manifold of a pumping system for supplying a fracturing fluid to well head.

1 Claim, 9 Drawing Sheets

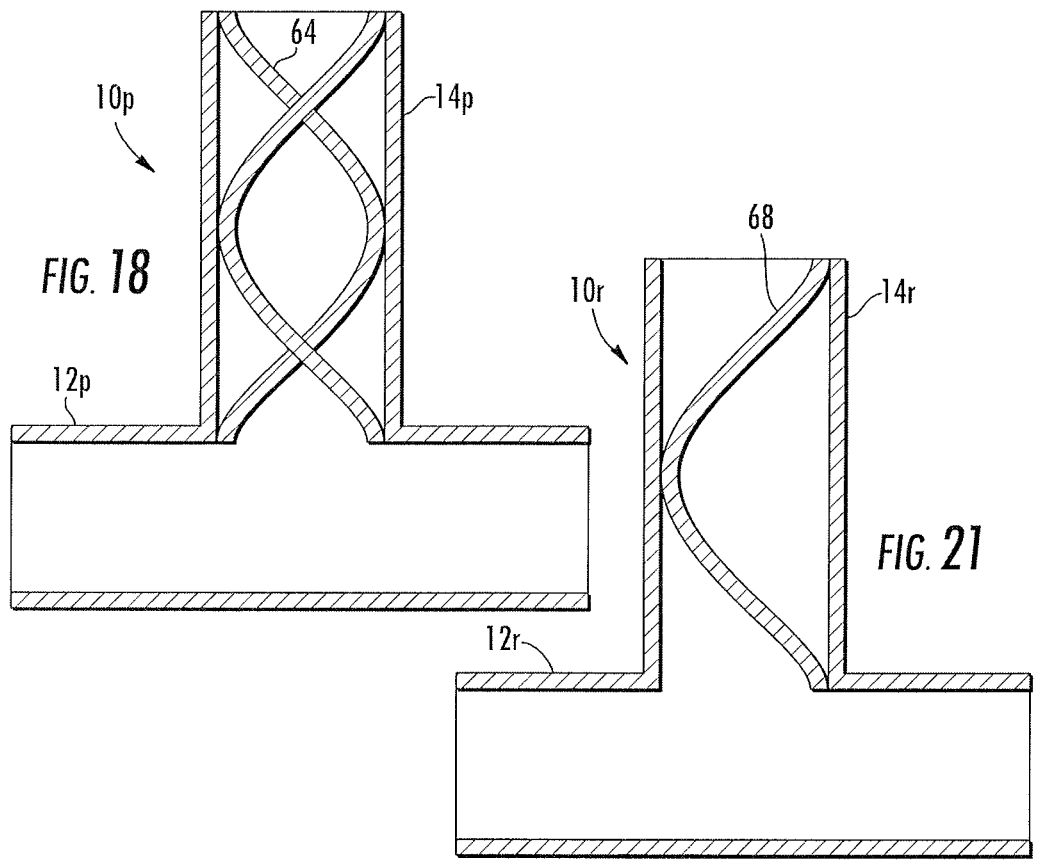
FIG. 18
FIG. 21
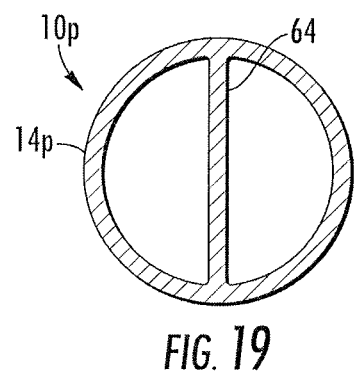
FIG. 19
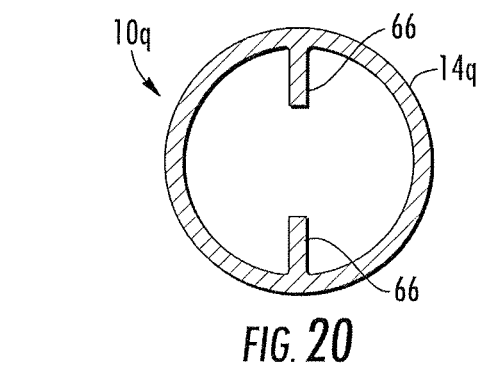
FIG. 20
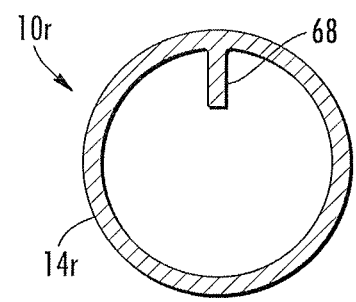
FIG. 22
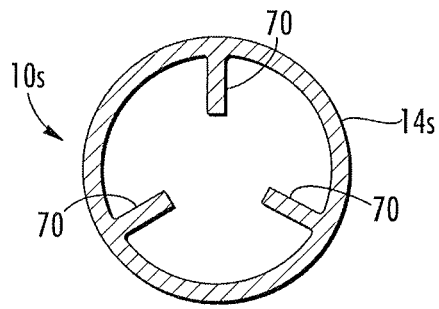
FIG. 23

VIBRATION REDUCING PIPE JUNCTION

CROSS-REFERENCE TO RELATED APPLICATIONS

The present application is a conversion of U.S. Provisional Application having U.S. Ser. No. 61/943,093, filed Feb. 21, 2014, which claims the benefit under 35 U.S.C. 119(e), the disclosure of which is hereby expressly incorporated herein by reference.

STATEMENT REGARDING FEDERALLY SPONSORED RESEARCH OR DEVELOPMENT

Not applicable.

BRIEF DESCRIPTION OF THE DRAWINGS

Several embodiments of the present disclosure are hereby illustrated in the appended drawings. It is to be noted however, that the appended drawings only illustrate several typical embodiments and therefore are not intended to be considered as limiting of the scope of the present disclosure. Further, in the appended drawings, like or identical reference numerals may be used to identify common or similar elements and not all such elements may be so numbered. The figures are not necessarily to scale and certain features and certain views of the figures may be shown as exaggerated in scale or in schematic in the interest of clarity and conciseness.

FIG. 18 is a cross-sectional view of an embodiment of a pipe junction constructed with a rotation inducing element, in accordance with the inventive concepts of the present disclosure.

FIG. 19 is a cross-sectional view of the vertical pipe section of the pipe junction of FIG. 18.

FIG. 20 is a cross-sectional view of an alternate embodiment of the vertical pipe section of the pipe junction of FIG. 18.

FIG. 21 is a cross-sectional view of another embodiment of a pipe junction constructed with a rotation inducing element, in accordance with the inventive concepts of the present disclosure.

FIG. 22 is a cross-sectional view of the vertical pipe section of the pipe junction of FIG. 21.

FIG. 23 is a cross-sectional view taken through a vertical pipe section of another embodiment of a pipe junction constructed with a rotation inducing element, in accordance with the inventive concepts of the present disclosure.

DETAILED DESCRIPTION

Figure 1:
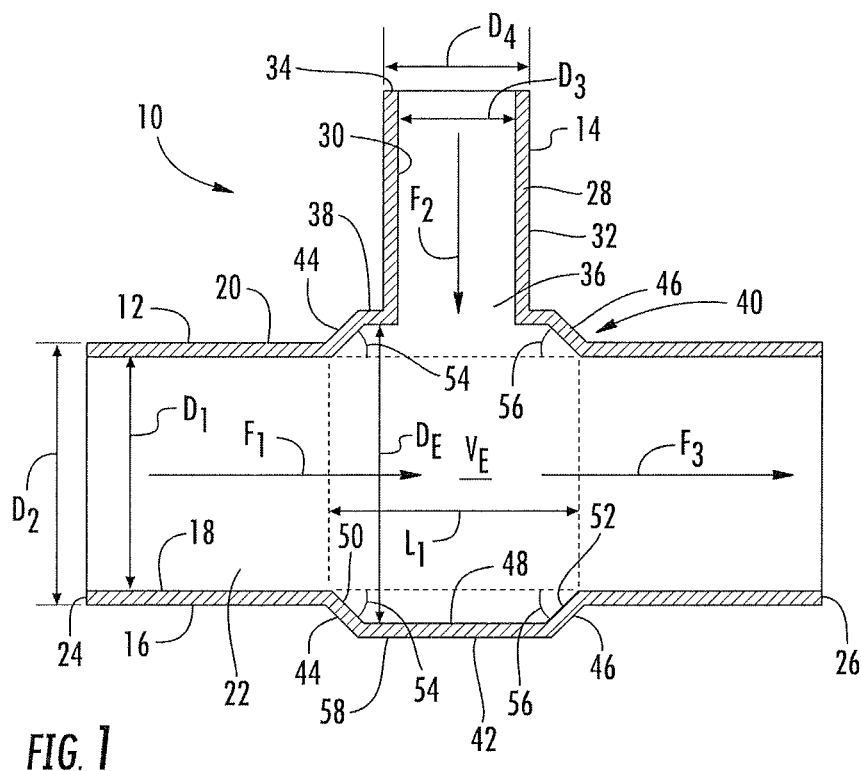
FIG. 1 is a cross-sectional view of a pipe junction constructed in accordance with the inventive concepts of the present disclosure.

Before explaining the several embodiments of the presently described inventive concepts in detail by way of exemplary drawings, experimentation, results, and laboratory procedures, it is to be understood that the inventive concepts are not limited in their application to the details of construction and the arrangement of the components set forth in the following description or illustrated in the drawings, experimentation and/or results. The inventive concepts are capable of other embodiments or of being practiced or carried out in various ways. As such, the language used herein is intended to be given the broadest possible scope and meaning; and the embodiments are meant to be exemplary, not exhaustive. Also, it is to be understood that the phraseology and terminology employed herein is for the purpose of description and should not be regarded as limiting.

Unless otherwise defined herein, scientific and technical terms used in connection with the presently disclosed inventive concepts shall have the meanings that are commonly understood by those of ordinary skill in the art. Further, unless otherwise required by context, singular terms shall include pluralities and plural terms shall include the singular. Generally, nomenclatures utilized herein are those well-known and commonly used in the art. The nomenclatures utilized herein are those well-known and commonly used in the art.

All patents, published patent applications, and non-patent publications mentioned in the specification are indicative of the level of skill of those skilled in the art to which the presently disclosed inventive concepts pertain. All patents, published patent applications, and non-patent publications referenced in any portion of this application are herein expressly incorporated by reference in their entirety to the same extent as if each individual patent or publication was specifically and individually indicated to be incorporated by reference.

All of the devices, apparatus, and/or methods disclosed herein can be made and executed without undue experimentation in light of the present disclosure. While the components and methods of this disclosure have been described in terms of particular embodiments, it will be apparent to those of skill in the art that variations may be applied to the components and/or methods and in the steps or in the sequence of steps of the methods described herein without departing from the concept, spirit and scope of the disclosure. All such similar substitutes and modifications apparent to those skilled in the art are deemed to be within the spirit, scope and concept of the inventive concepts as disclosed herein.

As utilized in accordance with the present disclosure, the following terms, unless otherwise indicated, shall be understood to have the following meanings:

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation or error for the device, the method being employed to determine the value, or the variation that exists among the study objects. The use of the term "at least one" will be understood to include one, as well as any quantity more than one, including, but not limited to, for example, 2, 3, 4, 5, 6, 7, 8, 9, 10, 15, 20, 30, 40, 50, 100, or greater. The term "at least one" may extend up to 100 or 1000 or more, depending on the term to which it is attached; in addition, the quantities of 100/1000 are not to be considered limiting, as higher limits may also produce satisfactory results in certain embodiments. In addition, the use of the term "at least one of X, Y and Z" (where X, Y and Z are intended to represent, for example, three or more objects) will be understood to include X alone, Y alone, and Z alone, as well as any combination of X, Y and Z, such as X and Y, X and Z, or Y and Z.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

Where used herein the term "fluid" is intended to mean any gas or liquid that can flow through a pipe, and the piping can be constructed of any material known in the art for transporting fluid, including but not limited to metals and high performance thermoplastics. Where used herein the symbol > refers to "greater than", the symbol < refers to "lesser than", and the symbol = refers to "equal to."

While the presently disclosed inventive concepts will now be described in connection with particular embodiments in the following examples so that aspects thereof may be more fully understood and appreciated, it is not intended to limit the presently disclosed inventive concepts to these particular embodiments. On the contrary, it is intended to cover all alternatives, modifications and equivalents as may be included within the scope of the presently disclosed inventive concepts as described herein. Thus, the following description serves to illustrate the practice of this presently disclosed inventive concepts, it being understood that the particular embodiments shown and discussed are by way of example and for purposes of illustrative discussion of the presently disclosed inventive concepts only and are presented in the cause of providing what is believed to be the most useful and readily understood description of formulation procedures and methods as well as of the principles and conceptual aspects of the presently disclosed inventive concepts.

Piping (pump) systems which are operated under high fluid pressure include numerous industries and apparatus. Industries which utilize such piping systems include, but are not limited to, oilfield operations, such as hydraulic fracturing, oil distribution and processing facilities such as petroleum distribution hubs and catalytic cracking plants, and electric power generating plants such as nuclear, coal, natural gas, hydroelectric, and solar facilities. Individual apparatus and machines such as automobiles, trucks, airplanes, trains, and other means or transport also incorporate fluid systems utilized under high pressures.

Figure 24:
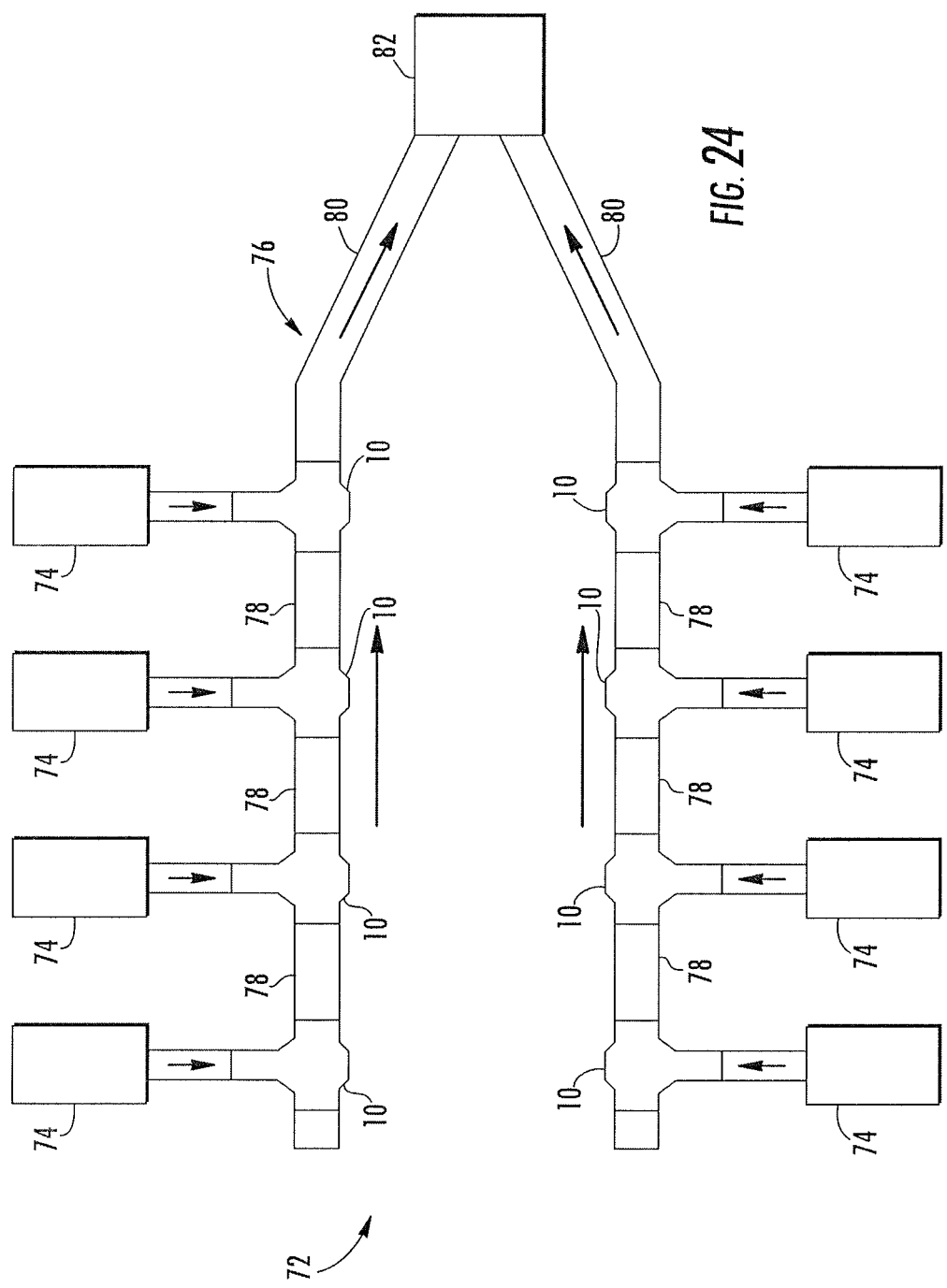
FIG. 24 is a schematic view of a pipe manifold of a pumping system constructed with the pipe junctions of FIG. 2.

Such piping systems which are operated under high pressures are often subject to problematic vibrations resulting from flow variations induced by the displacement pumps used in the piping system. For example, in the case of hydraulic fracturing equipment, multiple displacement pumps (e.g., up to 10-12) are commonly combined to cause fluid flow into a pipe manifold to increase flow volume into a well head (FIG. 24). This system creates a transient periodic flow velocity profile which is a function of the phases of the multiple pump crankshafts. Pipe T-junctions are commonly used with such hydraulic fracturing manifolds. Multiple T-junctions can be combined in series and in parallel (as described in more detail below) to combine the fluid flow from multiple pumps into a pipe manifold which is used to feed the fluid into a well head for causing hydraulic fracturing of geologic strata. However, such piping configurations suffer from vibrations, especially when the multiple pumps are, for example, (1) operating under high combined pressures (for example, total pressures of 7,000-8,000 psi are common and may even exceed 15,000 psi), operating under high flow rates, and (2) when the pumps operate "in phase." Under such high pressures, vibrational forces can be present that can result over time in damage to equipment, which includes not only the T-junctions and adjacent piping, but also other piping equipment carrying the fluid, or equipment that is attached to or surrounds the piping equipment, such as but not limited to the pumps, manifolds, pipes, and vehicles in the vicinity. In an extreme case a T-junction may "blow out" not only damaging the nearby equipment, and causing a shut down of the operation, but also potentially causing injury to nearby personnel. Therefore, the reduction in vibration of the T-junctions and other components of the pumping system provided by the use of the T-junctions disclosed herein confers increased safety at the well site.

The present disclosure thus describes pipe junctions, particularly T-junctions, having two inlets wherein two streams of fluid can be combined into one stream which exits a single outlet of the pipe junction (or alternately one inlet and two outlets). More specifically, the disclosure describes pipe T-junctions that reduce the vibrations caused when the two high pressure fluid streams are combined within a single pipe junction. In some embodiments of the pipe junctions described herein, the pipe junction has an enlarged zone wherein the two high pressure fluid streams are combined. The enlarged zone, when present, may be constructed in a number of different configurations, many of which are described in the present disclosure. It is not intended that the configurations of the enlarged zones be limited to only those shown and described herein.

Figure 2:
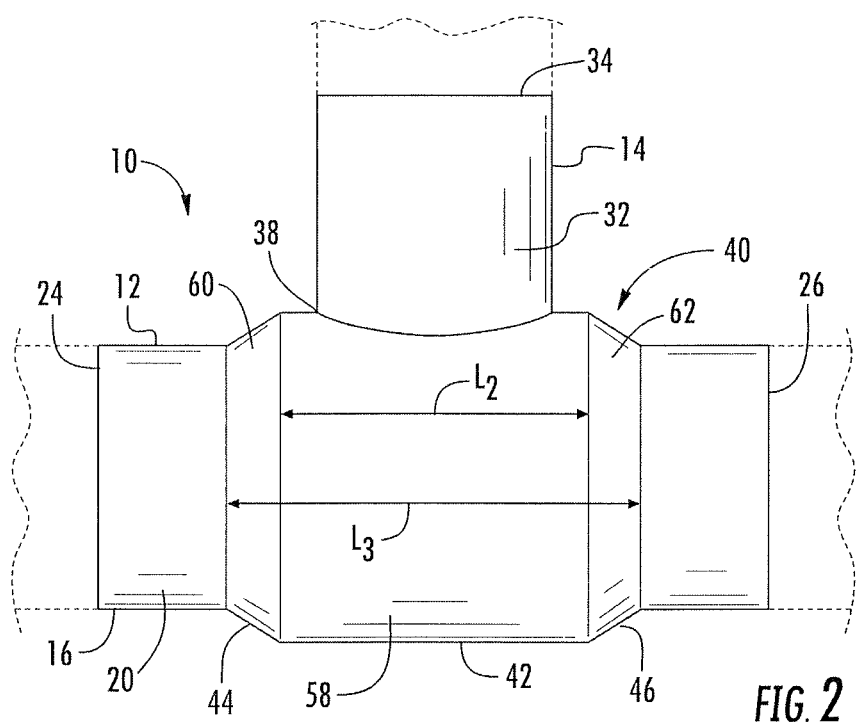
FIG. 2 is a perspective view of the pipe junction of FIG. 1.

Referring now to the drawings, shown in FIGS. 1 and 2 is a pipe junction 10 having a first (horizontal) pipe section 12 and a second (vertical) pipe section 14 extending from the first pipe section 12. In some embodiments the pipe junction 10 is also referred to herein as a T-junction. The second (vertical) pipe section 14 extends from the first pipe section 12 at an angle in a range of from 10° to 90°, such as for example, about 30°, about 45°, about 60°, about 75°, or about 90° (wherein the second pipe section 14 is perpendicular to the first pipe section 12 as shown in the drawings). The first pipe section 12 has a pipe wall 16 which has an inner surface 18, an outer surface 20, a bore 22, an inlet 24, and an outlet 26. The second pipe section 14 has a pipe wall 28 which has an inner surface 30, an outer surface 32, an inlet 34, an outlet 36, a junction 38 where the second pipe portion 14 is joined with the first pipe section 12. The pipe junction 10 has an enlarged zone 40 in a medial portion of the first pipe section 12 adjacent the junction 38. The enlarged zone 40 constitutes a zone within the first pipe section 12 which is enlarged such that the enlarged zone 40 has a maximum internal diameter which is larger than an internal diameter of the bore of the first pipe section 12, e.g., near the first outlet 24 thereof, for example as described in further detail below. The outlet 36 is in fluid communication with bore 22 of the first pipe section 12. When a first fluid stream $F_1$ flows through the inlet 24 into the bore 22 it combines in the enlarged zone 40 with a second fluid stream $F_2$ flowing through the second pipe section 14 into the enlarged zone 40 to form a third fluid stream $F_3$ which will exit the pipe junction 10 via the single outlet 26 of the first pipe section 12. When the pipe junction 10 is a terminal pipe junction (i.e., the pipe junction 10 furthest from a well head) it may only receive the fluid stream $F_2$.

The first pipe section 12 has an internal diameter $D_1$ adjacent the first inlet 24 (which is also the width of the bore 22) and an outer diameter $D_2$. The second pipe section 14 has an internal diameter $D_3$ and an outer diameter $D_4$. In some embodiments, the internal diameter $D_1$ and the diameter $D_3$ are approximately equal. In other embodiments, the internal diameter $D_1$ is greater than the diameter $D_3$ (e.g., as represented in the embodiment shown in FIGS. 1-2). In other embodiments, the internal diameter $D_1$ is less than the diameter $D_3$. The enlarged zone 40 has a maximum internal diameter $D_E$ and an internal length $L_1$. In this embodiment the inner diameter of the enlarged zone 40 tapers from $D_E$ to a diameter which is substantially equal to diameter $D_1$. The enlarged zone 40 thus has a volume $V_E$ which is a function of $D_E$. In some embodiments the volume $V_E$ of enlarged zone 40 is in a range of 5% to 100% (or more) greater than a standard pipe volume $V_S=3.1416(L_1)(D_1/2)^2$, (i.e., a volume equivalent to a non-expanded cylindrical portion of first pipe section 12 having diameter $D_1$ and length $L_1$). For example, the $V_E$ may be at least 5%>, at least 10%>, at least 15%>, at least 20%>, at least 25%>, at least 30%>, at least 35%>, at least 40%>, at least 45%>, at least 50%>, at least 55%>, at least 60%>, at least 65%>, at least 70%>, at least 75%>, at least 80%>, at least 85%>, at least 90%>, at least 95%>, or at least 100%>, or more, than a standard pipe volume $V_S$ as defined above. The $V_E$ may be within a range of any of the percentages identified above, including but not limited to, 10% to 40%>$V_S$, 15% to 30%>$V_S$, and 20% to 25%>$V_S$. The internal diameter D1 may be in a range of, for example but not limited to, about one inch to about five inches, for example 1 inch, 2 inches, 3 inches, or 4 inches.

The enlarged zone 40 of pipe junction 10 as shown in the embodiment of FIGS. 1-2 is configured to be a "bulge" in first pipe section 12 adjacent and below the position of the junction 38. The bulge configuration of the enlarged zone 40 is positioned in the pipe junction 10 at the location where the fluid stream $F_1$ merges with the fluid stream $F_2$ which is a location of high turbulence, especially, but not limited to, when the pumps which supply fluid streams $F_1$ and $F_2$ are in phase with each other. It is the novel discovery of the presently disclosed inventive concepts that in one embodiment an enlarged zone, such as those described in various embodiments herein, causes a reduction in the vibrations, a reduction in pipe wall erosion, and/or reduced stress concentration of the pipe junction 10 during operation of a pumping system, which is of significant benefit as discussed elsewhere herein. In the embodiment of FIGS. 1-2, the enlarged zone 40 is configured to have a central main wall 42 having an inner surface 48 and an outer surface 58, a first sidewall 44 positioned leftward of the main wall 42, the first sidewall 44 having an inner surface 50 and an outer surface 60, and a second sidewall 46 positioned rightward of the main wall 42, the second sidewall 46 having an inner surface 52 and an outer surface 62. The enlarged zone 40 has a minor outer length $L_2$ which is the length of the main wall 42 and a major length $L_3$ which is the maximum outer length of the enlarged zone 40 including the first sidewall 44 and the second sidewall 46. The first sidewall 44 extends outwardly at an angle 54 from the longitudinal axis of first pipe section 12 toward a vertical axis of the second pipe section 14.

It can also be seen that angle 54 is the angle between the inner surface 50 of first sidewall 44 and inner surface 18 of pipe wall 16 of first pipe section 12. The second sidewall 46 extends outwardly at an angle 56 from the longitudinal axis of first pipe section 12 toward a vertical axis of the second pipe section 14. It can also be seen that angle 56 is the angle between the inner surface 52 of second sidewall 46 and inner surface 18 of pipe wall 16 of first pipe section 12. In one embodiment angle 54 is equal to angle 56. In another embodiment angle 54 is not equal to angle 56. In one embodiment, the angle 54 and the angle 56 are each in a range of from about 15° to about 85°. For example, in non-limiting embodiments, the angle 54 and angle 56 may be in a range of from about 20° to about 75°, or a range of from about 25° to about 65°, or a range of from about 30° to about 60°, or a range of from about 30° to about 60°.

Figure 3:
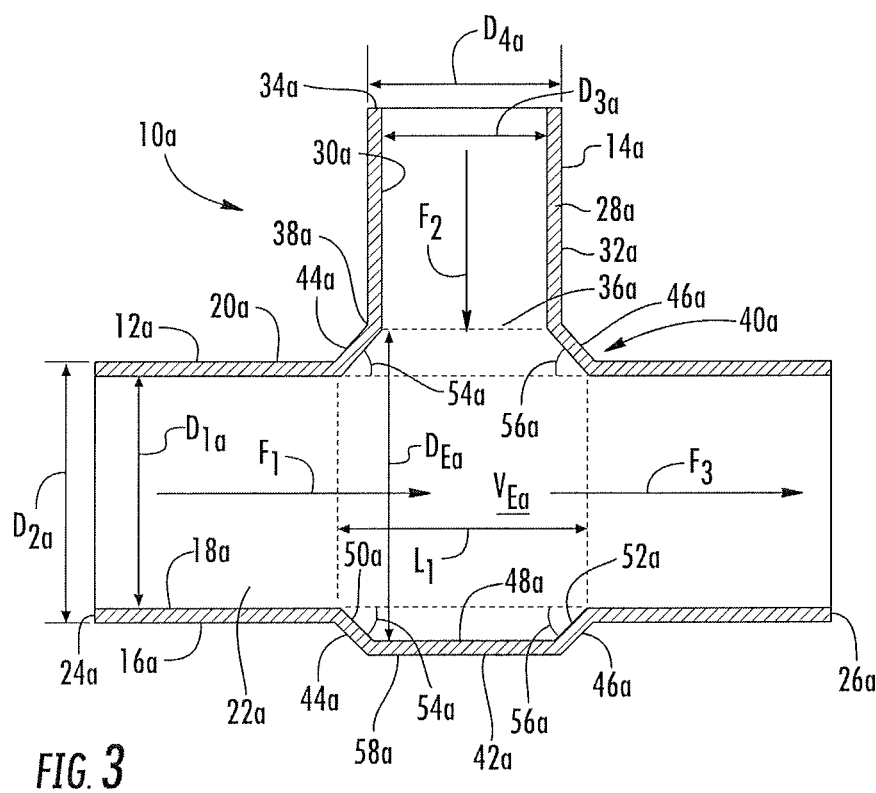
FIG. 3 is a cross-sectional view of another embodiment of a pipe junction constructed in accordance with the inventive concepts of the present disclosure.
Figure 4:
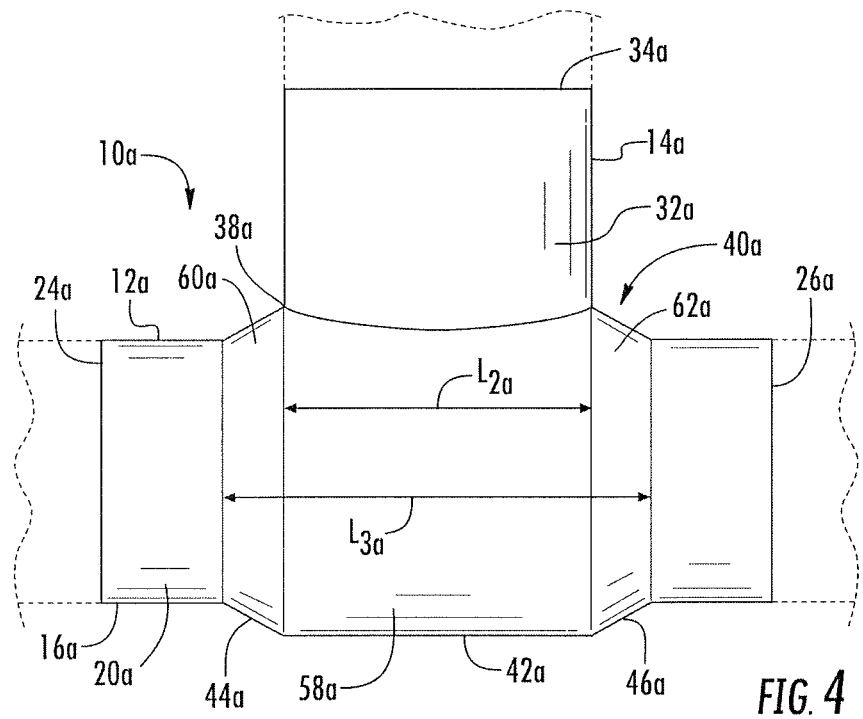
FIG. 4 is a perspective view of the pipe junction of FIG. 3.

Referring now to FIGS. 3 and 4 is a pipe junction 10a which is similar to the pipe junction 10 and has a first (horizontal) pipe section 12a and a second (vertical) pipe section 14a extending from the first pipe section 12a. In some embodiments the pipe junction 10a is also referred to herein as a T-junction. The second (vertical) pipe section 14a extends from the first pipe section 12a at an angle in a range of from 10° to 90°, such as for example, about 30°, about 45°, about 60°, about 75°, or about 90° (wherein the second pipe section 14a is perpendicular to the first pipe section 12a as shown in the drawings). The first pipe section 12a has a pipe wall 16a which has an inner surface 18a, an outer surface 20a, a bore 22a, an inlet 24a, and an outlet 26a. The second pipe section 14a has a pipe wall 28a which has an inner surface 30a, an outer surface 32a, an inlet 34a, an outlet 36a, a junction 38a where the second pipe portion 14a is joined with the first pipe section 12a. The pipe junction 10a has an enlarged zone 40a in a medial portion of the first pipe section 14a adjacent the junction 38a. The outlet 36a is in fluid communication with bore 22a of the first pipe section 12a. When a first fluid stream $F_1$ flows through the inlet 24a into the bore 22a it combines in the enlarged zone 40a with a second fluid stream $F_2$ flowing through the second pipe section 14a into the enlarged zone 40a to form a third fluid stream $F_3$ which will exit the pipe junction 10a via the single outlet 26a of the first pipe section 12a. When the pipe junction 10a is a terminal pipe junction (i.e., distal to a well head) it may only receive the fluid stream $F_2$.

The first pipe section 12a has an internal diameter $D_{1a}$ (which is also the width of the bore 22a) and an outer diameter $D_{2a}$. The second pipe section 14a has an internal diameter $D_{3a}$ and an outer diameter $D_{4a}$. In some embodiments, the internal diameter $D_{1a}$ and the diameter $D_{3a}$ are approximately equal. In other embodiments, the internal diameter $D_{1a}$ is greater than the diameter $D_{3a}$ (e.g., as represented in the embodiment shown in FIGS. 3-4). In other embodiments, the internal diameter $D_{1a}$ is less than the diameter $D_{3a}$. The enlarged zone 40a has a maximum internal diameter $D_{Ea}$ and an internal length $L_{1a}$. In this embodiment the inner diameter of the enlarged zone 40a tapers from $D_{Ea}$ to a diameter which is substantially equal to diameter $D_{1a}$. The enlarged zone 40a thus has a volume $V_{Ea}$ which is a function of $D_{Ea}$. In some embodiments the volume $V_{Ea}$ of enlarged zone 40a is in a range of 5% to 100% (or more) greater than a standard pipe volume $V_{Sa}=3.1416(L_1)(D_1/2)^2$, (i.e., a volume equivalent to a non-expanded cylindrical portion of first pipe section 12a having diameter $D_{1a}$ and length $L_{1a}$). For example, the $V_{Ea}$ may be at least 5%>, at least 10%>, at least 15%>, at least 20%>, at least 25%>, at least 30%>, at least 35%>, at least 40%>, at least 45%>, at least 50%>, at least 55%>, at least 60%>, at least 65%>, at least 70%>, at least 75%>, at least 80%>, at least 85%>, at least 90%>, at least 95%>, or at least 100%>, or more, than a standard pipe volume $V_{Sa}$ as defined above. The $V_{Ea}$ may be within a range of any of the percentages identified above, including but not limited to, 10% to 40%>$V_{Sa}$, 15% to 30%>$V_{Sa}$, and 20% to 25%>$V_{Sa}$.

The enlarged zone 40a of pipe junction 10a as shown in the embodiment of FIGS. 3-4 is configured to be a "bulge" in first pipe section 12a adjacent and below the position of the junction 38a. The bulge configuration of the enlarged zone 40a is positioned in the pipe junction 10a at the location where the fluid stream $F_1$ merges with the fluid stream $F_2$ which is a location of high turbulence, especially, but not limited to, when the pumps which supply fluid streams $F_1$ and $F_2$ are in phase with each other. It is a novel discovery of the presently disclosed inventive concepts that in one embodiment an enlarged zone, such as those described in various embodiments herein, causes a reduction in the vibrations, a reduction in pipe wall erosion, and/or reduced stress concentration of the pipe junction 10a during operation of a pumping system, which is of significant benefit. In the embodiment of FIGS. 3-4, the enlarged zone 40a is configured to have a central main wall 42a having an inner surface 48a and an outer surface 58a, a first sidewall 44a positioned leftward of the main wall 42a, the first sidewall 44a having an inner surface 50a and an outer surface 60a, and a second sidewall 46a positioned rightward of the main wall 42a, the second sidewall 46a having an inner surface 52a and an outer surface 62a. The enlarged zone 40a has a minor outer length $L_{2a}$ which is the length of the main wall 42a and a major length $L_{3a}$ which is the maximum outer length of the enlarged zone 40a including the first sidewall 44a and the second sidewall 46a. The first sidewall 44a extends outwardly at an angle 54a from the longitudinal axis of first pipe section 12a toward a vertical axis of the second pipe section 14a.

It can also be seen that angle 54a is the angle between the inner surface 50a of first sidewall 44a and inner surface 18a of pipe wall 16a of first pipe section 12a. The second sidewall 46a extends outwardly at an angle 56a from the longitudinal axis of first pipe section 12a toward a vertical axis of the second pipe section 14a. It can also be seen that angle 56a is the angle between the inner surface 52a of second sidewall 46a and inner surface 18a of pipe wall 16a of first pipe section 12a. In one embodiment angle 54a is equal to angle 56a. In another embodiment angle 54a is not equal to angle 56a. In one embodiment, the angle 54a and the angle 56a are each in a range of from about 15° to about 85°. For example, in non-limiting embodiments, the angle 54a and angle 56a may be in a range of from about 20° to about 75°, or a range of from about 25° to about 65°, or a range of from about 30° to about 60°, or a range of from about 30° to about 50°.

Figure 5:
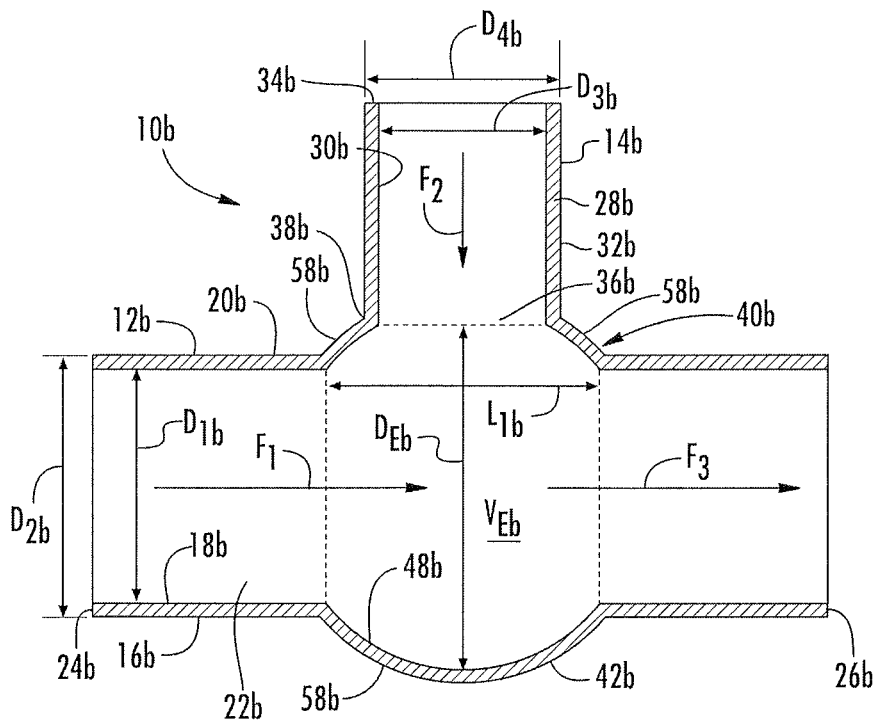
FIG. 5 is a cross-sectional view of another embodiment of a pipe junction constructed in accordance with the inventive concepts of the present disclosure.
Figure 6:
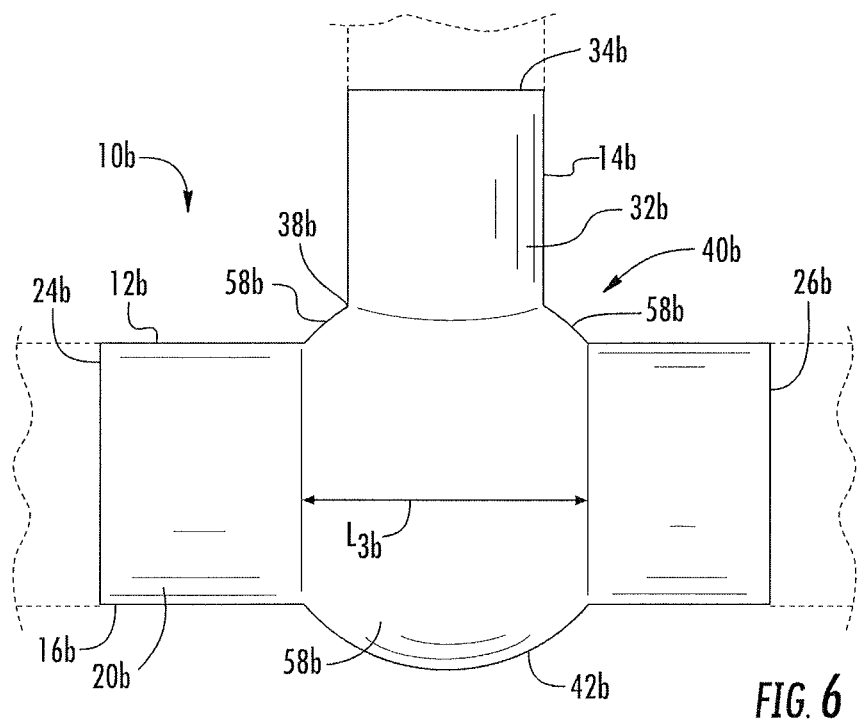
FIG. 6 is a perspective view of the pipe junction of FIG. 5.

Referring now to FIGS. 5-6 is a pipe junction 10b similar to pipe junction 10 which has a first (horizontal) pipe section 12b and a second (vertical) pipe section 14b extending from the first pipe section 12b. In some embodiments the pipe junction 10b is also referred to herein as a T-junction. The second (vertical) pipe section 14b extends from the first pipe section 12b at an angle in a range of from 10° to 90°, such as for example, about 30°, about 45°, about 60°, about 75°, or about 90° (wherein the second pipe section 14b is perpendicular to the first pipe section 12b as shown in the drawings). The first pipe section 12b has a pipe wall 16b which has an inner surface 18b, an outer surface 20b, a bore 22b, an inlet 24b, and an outlet 26b. The second pipe section 14b has a pipe wall 28b which has an inner surface 30b, an outer surface 32b, an inlet 34b, an outlet 36b, a junction 38b where the second pipe portion 14b is joined with the first pipe section 12b. The pipe junction 10b has an enlarged zone 40b in a medial portion of the first pipe section 14b adjacent the junction 38b. The outlet 36b is in fluid communication with bore 22b of the first pipe section 12b. When a first fluid stream $F_1$ flows through the inlet 24b into the bore 22b it combines in the enlarged zone 40b with a second fluid stream $F_2$ flowing through the second pipe section 14b into the enlarged zone 40b to form a third fluid stream $F_3$ which will exit the pipe junction 10b via the single outlet 26b of the first pipe section 12b. When the pipe junction 10b is a terminal pipe junction (i.e., distal to a well head) it may only receive the fluid stream $F_2$.

The first pipe section 12b has an internal diameter $D_{1b}$ (which is also the width of the bore 22b) and an outer diameter $D_{2b}$. The second pipe section 14b has an internal diameter $D_{3b}$ and an outer diameter $D_{4b}$. In some embodiments, the internal diameter $D_{1b}$ and the diameter $D_{3b}$ are approximately equal. In other embodiments, the internal diameter $D_{1b}$ is greater than the diameter $D_{3b}$ (e.g., as represented in the embodiment shown in FIGS. 5-6). In other embodiments, the internal diameter $D_{1b}$ is less than the diameter $D_{3b}$. The enlarged zone 40b has a maximum internal diameter $D_{Eb}$ and an internal length $L_{1b}$. In this embodiment the inner diameter of the enlarged zone 40b transitions from $D_{Eb}$ to a diameter which is substantially equal to diameter $D_{1b}$. The enlarged zone 40b thus has a volume $V_{Eb}$ which is a function of $D_{Eb}$. In some embodiments the volume $V_{Eb}$ of enlarged zone 40b is in a range of 5% to 100% (or more) greater than a standard pipe volume $V_{Sb}=3.1416(L_1)(D_1/2)^2$, (i.e., a volume equivalent to a non-expanded cylindrical portion of first pipe section 12b having diameter $D_{1b}$ and length $L_{1b}$). For example, the $V_{Eb}$ may be at least 5%>, at least 10%>, at least 15%>, at least 20%>, at least 25%>, at least 30%>, at least 35%>, at least 40%>, at least 45%>, at least 50%>, at least 55%>, at least 60%>, at least 65%>, at least 70%>, at least 75%>, at least 80%>, at least 85%>, at least 90%>, at least 95%>, or at least 100%>, or more, than a standard pipe volume $V_{Sb}$ as defined above. The $V_{Eb}$ may be within a range of any of the percentages identified above, including but not limited to, 10% to 40%>$V_{Sb}$, 15% to 30%>$V_{Sb}$, and 20% to 25%>$V_{Sb}$.

The enlarged zone 40b of pipe junction 10b as shown in the embodiment of FIGS. 5-6 is configured to be a "bulge" in first pipe section 12b adjacent and below the position of the junction 38b. The bulge configuration of the enlarged zone 40b is positioned in the pipe junction 10b at the location where the fluid stream $F_1$ merges with the fluid stream $F_2$ which is a location of high turbulence, especially, but not limited to, when the pumps which supply fluid streams $F_1$ and $F_2$ are in phase with each other. As noted above, it is a novel discovery of the presently disclosed inventive concepts that in one embodiment an enlarged zone, such as those described in various embodiments herein, causes a reduction in the vibrations, a reduction in pipe wall erosion, and/or reduced stress concentration of the pipe junction 10b during operation of a pumping system, which is of significant benefit. In the embodiment of FIGS. 5-6, the enlarged zone 40b is configured to have an outwardly curved wall 42b having an inner surface 48b and an outer surface 58b. The enlarged zone 40b, in the perspective view of FIG. 6, has an outer length $L_{3b}$ which is the length of the wall 42b. The outer surface 58b of wall 42b has an outwardly convex curvature such that the enlarged zone 40b has a bulbous shape, as indicated in cross-section in FIG. 5 and in perspective in FIG. 6.

Figure 7:
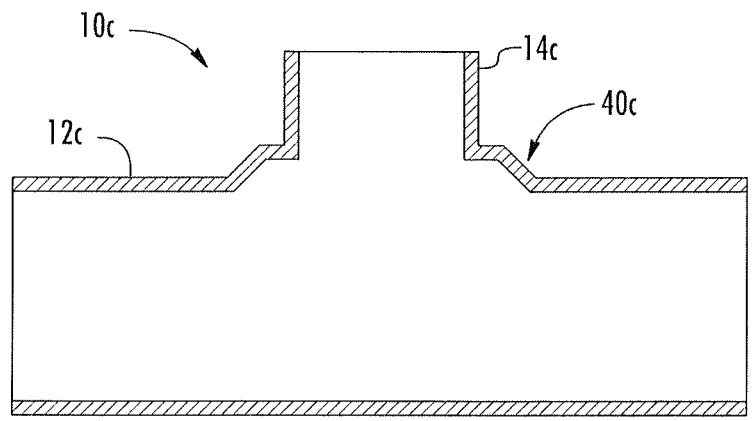
FIG. 7 is a cross-sectional view of another embodiment of a pipe junction constructed in accordance with the inventive concepts of the present disclosure.
Figure 8:
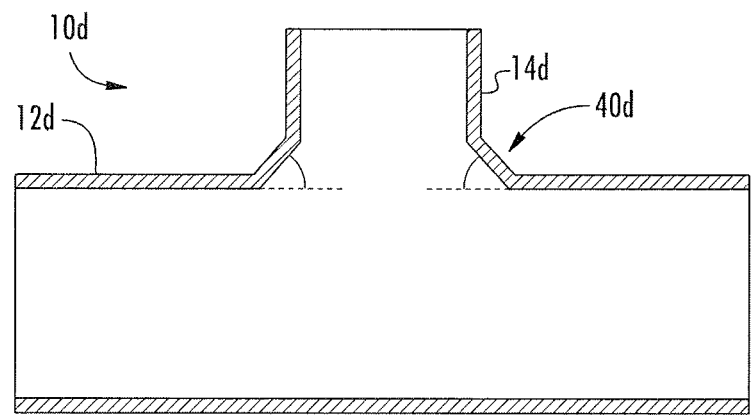
FIG. 8 is a cross-sectional view of another embodiment of a pipe junction constructed in accordance with the inventive concepts of the present disclosure.
Figure 9:
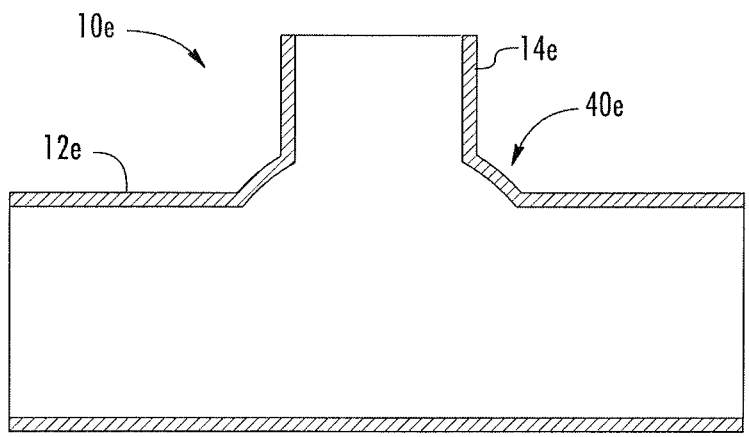
FIG. 9 is a cross-sectional view of another embodiment of a pipe junction constructed in accordance with the inventive concepts of the present disclosure.

Additional, non-limiting, embodiments of the pipe junction of the presently disclosed inventive concepts which are similar in certain aspects to pipe junctions 10-10b are shown in FIGS. 7-23. In these embodiments the enlarged zone does not extend around the entire circumference (i.e., diametrically) of the horizontal pipe section. In particular, FIG. 7 shows a cross-section of a pipe junction 10c having a first pipe section 12c, a second pipe section 14c and an enlarged zone 40c. The enlarged zone 40c is similar in profile to an upper portion of enlarged zone 40 of pipe junction 10 of FIGS. 1-2. The enlarged zone 40c extends only partially about the first pipe section 12c and provides a portion of the volume $V_E$ of pipe junction 10. FIG. 8 shows a cross-section of a pipe junction 10d having a first pipe section 12d, a second pipe section 14d and an enlarged zone 40d. The enlarged zone 40d is similar in profile to an upper portion of enlarged zone 40a of pipe junction 10a of FIGS. 3-4. The enlarged zone 40d extends only partially about the first pipe section 12d and provides a portion of the volume $V_{Ea}$ of pipe junction 10a. FIG. 9 shows a cross-section of a pipe junction 10e having a first pipe section 12e, a second pipe section 14e and an enlarged zone 40e. The enlarged zone 40e is similar in profile to an upper portion of enlarged zone 40b of pipe junction 10b of FIGS. 5-6. The enlarged zone 40e extends only partially about the first pipe section 12e and provides a portion of the volume $V_{Eb}$ of pipe junction 10b.

Figure 10:
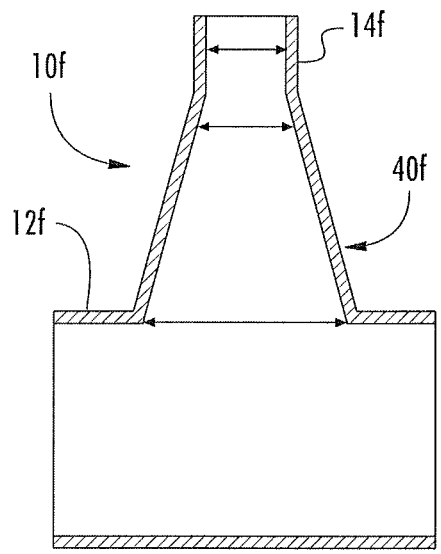
FIG. 10 is a cross-sectional view of another embodiment of a pipe junction constructed in accordance with the inventive concepts of the present disclosure.

FIG. 10 shows in cross-section another embodiment of a pipe junction, referred to as pipe junction 10f, of the presently disclosed inventive concepts. The pipe junction 10f has a first pipe section 12f and a second pipe section 14f which comprises a conical enlarged zone 40f. The enlarged zone 40f is thus substantially within the vertical second pipe section 14f, but may extend a distance diametrically about the first pipe section 12f (not shown). The enlarged zone 40f is similar in profile to enlarged zone 40d of FIG. 8 except the conical portion of enlarged zone 40f is shown as having a greater height that enlarged zone 40d in relation to the corresponding second pipe section 14f and 14d, respectively.

Figure 11:
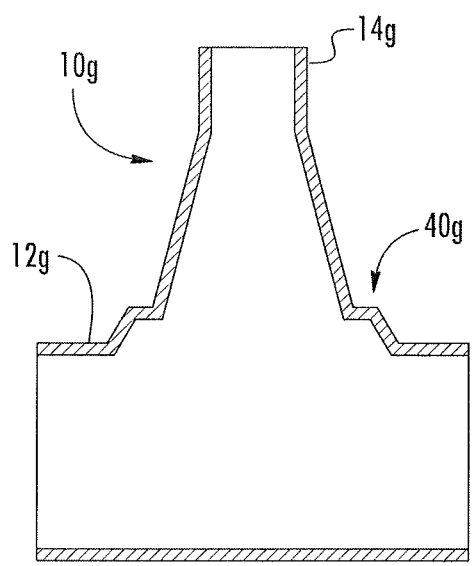
FIG. 11 is a cross-sectional view of another embodiment of a pipe junction constructed in accordance with the inventive concepts of the present disclosure.
Figure 11A:
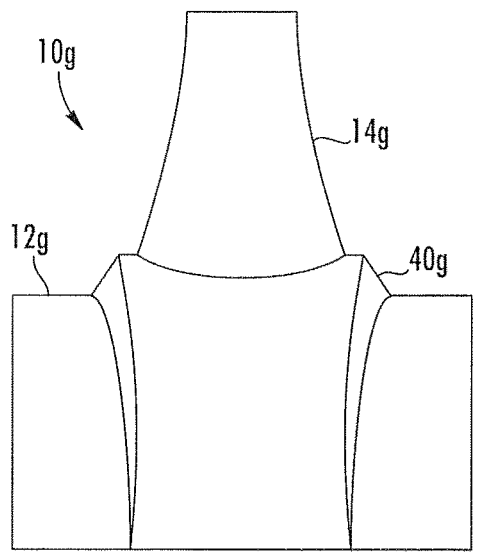
FIG. 11A is a perspective view of the embodiment of FIG. 11.

FIGS. 11-11A show in cross-section and perspective view another embodiment of a pipe junction, referred to as pipe junction 10g, of the presently disclosed inventive concepts. The pipe junction 10g has a first pipe section 12g and a second pipe section 14g which comprises an enlarged zone 40g that comprises both a conical portion similar to FIG. 10 and a portion similar in profile to that seen in FIG. 7, which extends partially about the first pipe section 12g in a manner similar to enlarged zone 40c. The enlarged zone 40g is thus partially within the vertical second pipe section 14g, but also extends a distance diametrically about the first pipe section 12g.

Figure 12:
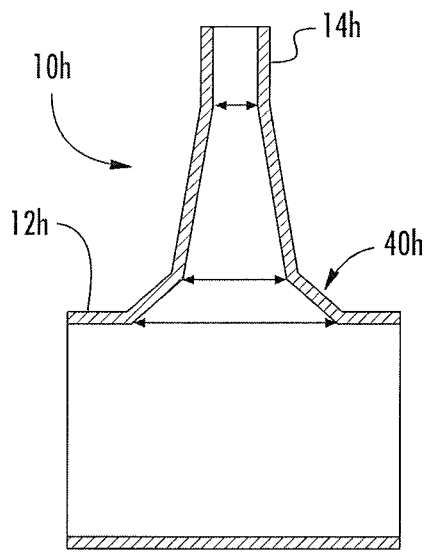
FIG. 12 is a cross-sectional view of another embodiment of a pipe junction constructed in accordance with the inventive concepts of the present disclosure.

FIG. 12 shows in cross-section another embodiment of a pipe junction, referred to as pipe junction 10h, of the presently disclosed inventive concepts. The pipe junction 10h has a first pipe section 12h and a second pipe section 14h which comprises an enlarged zone 40h that comprises both a conical portion similar to FIG. 10 and a portion similar in profile to that seen in FIG. 8, which extends partially about the first pipe section 12h in a manner similar to enlarged zone 40d. The enlarged zone 40h is thus partially within the vertical second pipe section 14h, but also extends a distance circumferentially about the first pipe section 12h.

Figure 13:
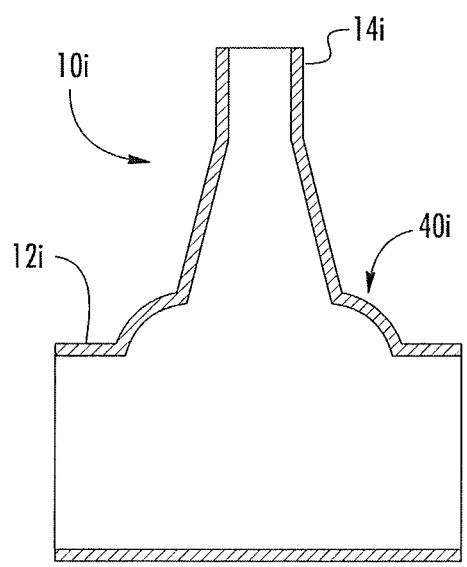
FIG. 13 is a cross-sectional view of another embodiment of a pipe junction constructed in accordance with the inventive concepts of the present disclosure.

FIG. 13 shows in cross-section another embodiment of a pipe junction, referred to as pipe junction 10i, of the presently disclosed inventive concepts. The pipe junction 10i has a first pipe section 12i and a second pipe section 14i which comprises an enlarged zone 40i that comprises both a conical portion similar to FIG. 10 and a portion similar in profile to that seen in FIG. 9, which extends partially about the first pipe section 12i in a manner similar to enlarged zone 40e. The enlarged zone 40i is thus partially within the vertical second pipe section 14i, but also extends a distance diametrically about the first pipe section 12i.

Figure 14A:
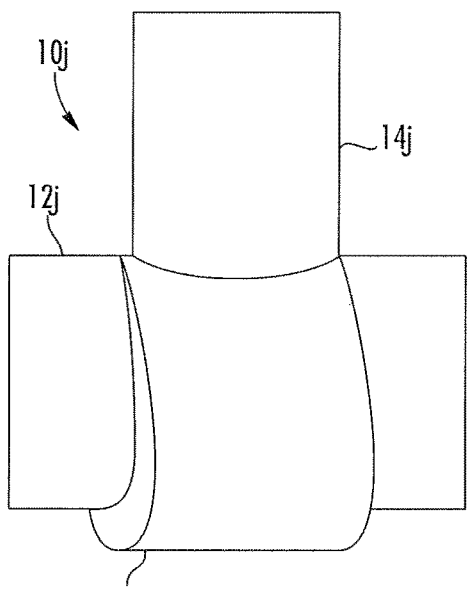
FIG. 14A is a perspective view of the embodiment of FIG. 14.
Figure 17:
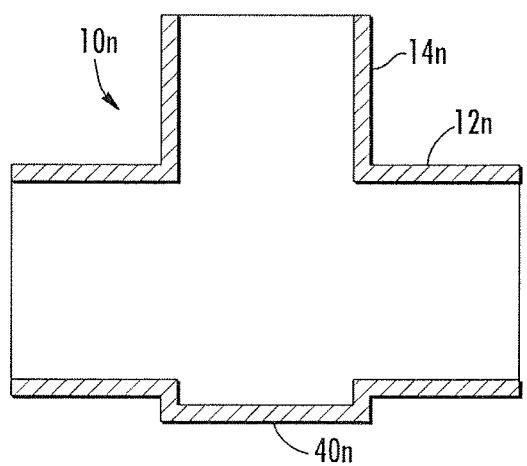
FIG. 17 is a cross-sectional view of another embodiment of a pipe junction constructed in accordance with the inventive concepts of the present disclosure.
Figure 17A:
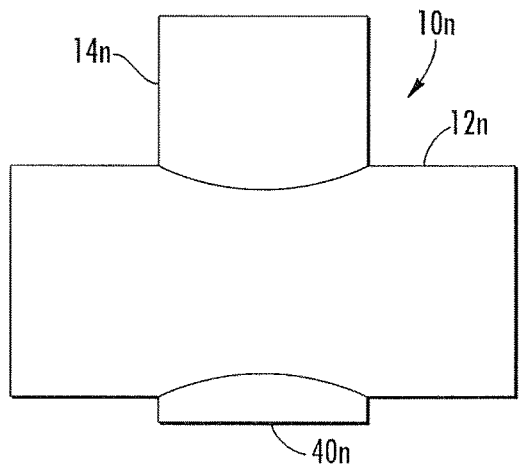
FIG. 17A is a perspective view of the embodiment of FIG. 17.
Figure 14:
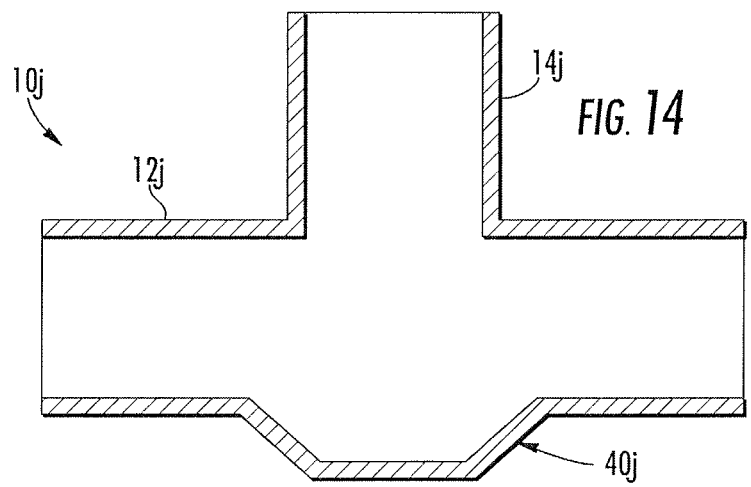
FIG. 14 is a cross-sectional view of another embodiment of a pipe junction constructed in accordance with the inventive concepts of the present disclosure.
Figure 15:
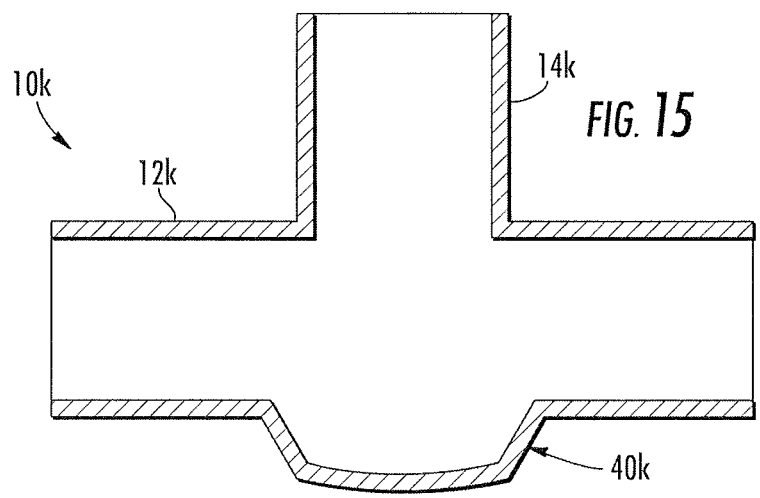
FIG. 15 is a cross-sectional view of another embodiment of a pipe junction constructed in accordance with the inventive concepts of the present disclosure.
Figure 16:
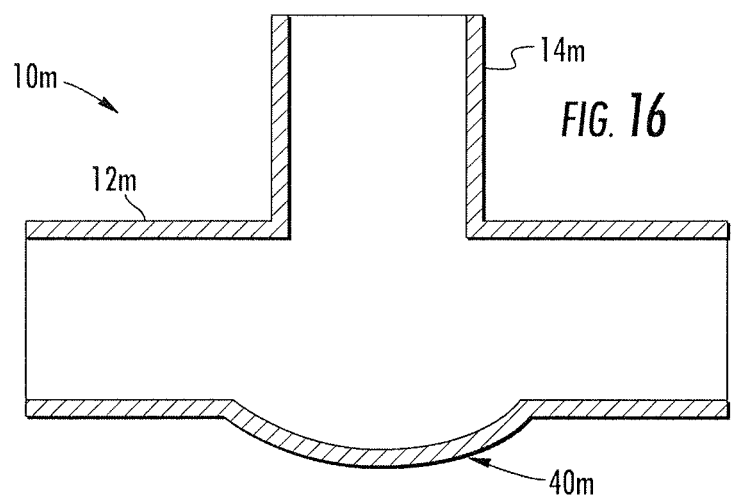
FIG. 16 is a cross-sectional view of another embodiment of a pipe junction constructed in accordance with the inventive concepts of the present disclosure.

FIGS. 14-14A show cross-sectional and perspective views of a pipe junction 10j having a first pipe section 12j, a second pipe section 14j and an enlarged zone 40j. The enlarged zone 40j is similar in profile to a lower portion of enlarged zone 40 of pipe junction 10 of FIGS. 1-2. The enlarged zone 40j extends only partially from the lower side upwardly about the first pipe section 12*j* and provides a portion of the volume V*E* of pipe junction 10. The enlarged zone 40*j* is thus substantially independent of second pipe section 14*j*. FIG. 15 shows a cross-section of a pipe junction 10*k* having a first pipe section 12*k*, a second pipe section 14*k* and an enlarged zone 40*k*. The enlarged zone 40*k* is similar in profile to that of enlarged zone 40*j* of pipe junction 10*j* of FIG. 14 except having a convexly curved central portion in cross section rather than a flat central portion in cross section as shown in FIG. 14. The enlarged zone 40*k* extends only partially from the lower side upwardly about the first pipe section 12*k* and provides a portion of the volume V*E* of pipe junction 10. The enlarged zone 40*k* is thus substantially independent of second pipe section 14*k*. FIG. 16 shows a cross-section of a pipe junction 10*m* having a first pipe section 12*m*, a second pipe section 14*m* and a convexly curved enlarged zone 40*m*. The enlarged zone 40*mb* is similar in profile to a lower portion of enlarged zone 40 of pipe junction 10*b* of FIGS. 5-6. The enlarged zone 40*m* extends only partially from the lower side upwardly about the first pipe section 12*m* and provides a portion of the volume V*Eb* of pipe junction 10*b*. The enlarged zone 40*m* is thus substantially independent of second pipe section 14*m*. FIGS. 17-17A show cross-sectional and perspective views of a pipe junction 10*n* having a first pipe section 12*n*, a second pipe section 14*n* and an enlarged zone 40*n* in the first pipe section 12*n* substantially directly below the second pipe section 14*n* but independent thereof.

FIGS. 18-23 show alternate embodiments of a pipe junction of the present disclosure. Pipe junction 10*n*, shown in FIG. 18, comprises a first pipe section 12*p*, a second pipe section 14*p*, and a rotation-inducing element 64 which comprises a helical flange. The helical flange of the rotation-inducing element 64 is a single fin which extends across an inner diameter of the second pipe section 14*p* as shown in FIG. 19 in cross section. The helical configuration of the rotation-inducing element 64 causes a fluid stream to rotate as it passes through the second pipe section 14*p* into the first pipe section 12*p*. FIG. 20 shows a cross-sectional view of a pipe junction 10*q* having a second pipe section 14*q* and a rotation-inducing element 66 which is similar to the rotation inducing element 64 except it does not extend across the entire lumen of pipe section 14*q*, but instead comprises a pair of fins having a helical configuration. FIGS. 21-23 show alternate embodiments of a vibration reducing pipe junction having a rotation-inducing element. Pipe junction 10*r*, shown in FIGS. 21-22, comprises a first pipe section 12*r*, a second pipe section 14*r*, and a rotation-inducing element 68 which comprises a helical flange. The helical flange of the rotation-inducing element 68 is a single fin which extends across only a portion of an inner diameter of the second pipe section 14*r* as shown in FIG. 22 in cross section. The rotation-inducing element 68 is similar to the rotation inducing element 66 of FIG. 20 except it comprises only one fin rather than two. The helical configuration of the rotation-inducing element 68 causes a fluid stream to at least partially rotate as it passes through the second pipe section 14*r* into the first pipe section 12*r*. FIG. 23 shows a cross-sectional view of an alternate pipe junction 10*s* having a second pipe section 14*s* and a helically-configured rotation-inducing element 70 which is similar to the rotation inducing element 66 of FIG. 20 except it comprises three fins (or more, not shown), none of which extend across the entire lumen of pipe section 14*s*, but instead comprises three (or more) fins having a helical configuration for causing a fluid stream to at least partially rotate as it passes through the second pipe section 14*s* into a first pipe section of pipe junction 10*s*.

Any of the embodiments of the pipe junctions 10-10*n* can be modified to include any of the rotation-inducing elements described herein.

As noted previously, another embodiment of the presently described inventive concepts is directed to a pumping system comprising pipe junctions of the presently described inventive concepts. Shown schematically in FIG. 24 is a pumping system 72 which comprises a plurality of pipe junctions 10, each of which is connected to at least one pipe connector 78 thereby forming a pipe manifold 76 which combines a plurality of fluid streams from pumps 74 for delivery via feeder pipes 80 to a well head 82. For example, the fluid streams can be fracturing fluids which are delivered under high pressure to the wellhead, as discussed previously. Although pipe junctions 10 is indicated in FIG. 24, any of the pipe junctions described herein can be used instead, either solely or in combination. Use of the pipe junctions 10-10*n* of the presently described inventive concepts, for example, results in lesser vibrations experienced by the pumping system 72 during its operation. The pumping system 72 is shown as including eight pumps 74 and eight pipe junctions 10, but pumping systems having fewer than eight pipe junctions (e.g., 1 to 7) or more than eight pipe junctions (e.g., 9 to 16, or more) are also included in the presently described inventive concepts.

It is to be understood that even though numerous characteristics and aspects of various embodiments of the presently disclosed inventive concepts have been set forth in the foregoing description, together with details of the structure and function of various embodiments disclosed, this detailed description is illustrative only, and changes may be made in detail, especially in matters of structure and arrangements of parts within the principles of the present disclosure to the full extent indicated by the broad general meaning of the terms in which the appended claims are expressed. Moreover, the following claims are exemplary claims supported by the present disclosure and are not intended to be limiting of the claims which can be pursued in subsequent patent applications based on the present application.

What is claimed is:

1. A method of reducing vibration in a process of delivering a fracturing fluid to a well head, comprising:
   providing a pipe manifold comprising a plurality of pipe junctions,
      each pipe junction comprising:
      a first pipe section having a bore, a first inlet and an outlet, the bore having an internal diameter;
      a second pipe section having a second inlet, the second pipe section attached to and extending from the first pipe section to form a junction between the first pipe section and the second pipe section, wherein the second pipe section is in fluid communication with the first pipe section and extends from the first pipe section at an angle in a range of from 10° to 90°; and
      an enlarged zone in a medial portion of the first pipe section, the enlarged zone having a maximum internal diameter which exceeds the internal diameter of the bore of the first pipe section, and wherein when a first fluid stream is introduced into the first pipe section and a second fluid stream is introduced into the second pipe section, the first fluid stream and second fluid stream merge in the enlarged zone to form a combined fluid stream, wherein the pipe manifold is connected to a well head;
   providing multiple displacement pumps having multiple pump crankshafts;

connecting the multiple displacement pumps to the plurality of pipe junctions of the pipe manifold; and causing the multiple displacement pumps to deliver a fracturing fluid into the pipe manifold such that a transient periodic flow velocity is created by the multiple pump crankshafts, the transient periodic flow velocity causing vibrations in the pipe junctions when the first fluid stream and the second fluid stream merge in the enlarged zone to form a combined fluid stream in each pipe junction, and wherein the enlarged zone of each pipe junction reduces the vibrations caused therein by the transient periodic flow velocity created by the multiple pump crankshafts.

* * * * *